United States Patent
Bedard et al.

(10) Patent No.: US 11,828,670 B2
(45) Date of Patent: Nov. 28, 2023

(54) RETAINING SYSTEM FOR ROTOR BALANCING

(71) Applicant: Raytheon Technologies Corporation, Farmington, CT (US)

(72) Inventors: Tim R. Bedard, New Britain, CT (US); James P. Chrisikos, Vernon, CT (US); David P. Dube, Saco, ME (US); Jeffrey W. Sutliff, West Hartford, CT (US); Diane D. Walsh, Marlborough, CT (US); Jordan Tresser, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 267 days.

(21) Appl. No.: 17/314,787

(22) Filed: May 7, 2021

(65) Prior Publication Data
US 2022/0357228 A1   Nov. 10, 2022

(51) Int. Cl.
*G01M 1/04* (2006.01)
(52) U.S. Cl.
CPC .............. *G01M 1/04* (2013.01); *G01M 1/045* (2013.01)
(58) Field of Classification Search
CPC .................................. G01M 1/04; G01M 1/045
See application file for complete search history.

(56) References Cited

U.S. PATENT DOCUMENTS

| 2,813,428 A * | 11/1957 | Hagedorn ............... G01M 1/04 73/480 |
| 4,302,975 A | 12/1981 | Sugiyama et al. |
| 10,022,807 B2 | 7/2018 | Haimer et al. |
| 10,190,655 B2 | 1/2019 | Luinaud et al. |
| 2019/0113499 A1* | 4/2019 | Xiao ...................... G01N 33/86 |
| 2020/0131908 A1 | 4/2020 | Luinaud et al. |

FOREIGN PATENT DOCUMENTS

| DE | 3619467 A1 | 12/1987 |
| DE | 102005003766 A1 | 8/2006 |
| JP | 10318254 A | 12/1998 |
| WO | 2011070100 A1 | 6/2011 |

OTHER PUBLICATIONS

Extended European Search Report for Application No. 22172387.7 dated Oct. 10, 2022.

* cited by examiner

*Primary Examiner* — Paul M. West
(74) *Attorney, Agent, or Firm* — CANTOR COLBURN LLP

(57) ABSTRACT

An assembly of a rotating component and a rotationally stationary component includes a first bearing portion located at the rotating component and rotatable therewith, and a second bearing portion located at the rotationally stationary component. The second bearing portion is supported at the rotationally stationary component and rotatably with the rotating component when in contact with the first bearing portion. The first bearing portion and the second bearing portion define a single point contact therebetween.

18 Claims, 3 Drawing Sheets

RETAINING SYSTEM FOR ROTOR BALANCING

BACKGROUND

Exemplary embodiments pertain to the art of rotor assemblies for, for example, gas turbine engines, and more particularly to balancing of rotor assemblies.

For smooth and efficient operation, rotor assemblies are balanced before build into a next level assembly, such as a compressor module of a gas turbine engine. Balancing the rotor assembly typically involves mounting the rotor assembly onto a balancing fixture having bearings on which the rotor assembly is rotatable. The rotor assembly is rotated about its central axis, and an amount and angular location of imbalance of the rotor assembly is measured, often with the aid of electronic sensors and software. If desired, the imbalance is corrected and/or compensated for before the rotor assembly proceeds to the next level assembly. To ensure proper axial position of the rotor assembly on the balance fixture, one or more axial restraints are utilized. A typical axial restraint for balancing increases friction into the rotor assembly, and produces noise and resonance that interrupts the balancing software signal, making it difficult to detect the true imbalance of the rotor assembly. In addition to the increased friction between the stationary and rotating surfaces, the typical axial restraint adds angular moment forces into the system which may alter the detection of true rotor assembly imbalance.

BRIEF DESCRIPTION

In one embodiment, an assembly of a rotating component and a rotationally stationary component includes a first bearing portion located at the rotating component and rotatable therewith, and a second bearing portion located at the rotationally stationary component. The second bearing portion is supported at the rotationally stationary component and rotatably with the rotating component when in contact with the first bearing portion. The first bearing portion and the second bearing portion define a single point contact therebetween.

Additionally or alternatively, in this or other embodiments a first angular contact bearing installed to the rotationally stationary component and supportive of the second bearing portion, the angular contact bearing allowing for rotation of the second bearing portion relative to the rotationally stationary component.

Additionally or alternatively, in this or other embodiments the first bearing portion contacts a contact surface of the second bearing portion, the second bearing portion rotates together with the rotating component.

Additionally or alternatively, in this or other embodiments the contact surface is flat and planar.

Additionally or alternatively, in this or other embodiments the contact surface has a non-planar shape.

Additionally or alternatively, in this or other embodiments the first bearing portion is one of a ball bearing or a conical bearing.

In another embodiment, a system for balancing a rotor assembly includes an arbor to which a rotor assembly is installable, such that the arbor and rotor assembly are rotatable together about a central longitudinal axis. A first axial restraint is located at a first axial end of the arbor. The first axial restraint is rotationally stationary and is configured to limit axial travel of the arbor toward the first axial restraint during rotation of the arbor. A first bearing assembly operably connects the arbor to the first axial restraint. The first bearing assembly includes a first arbor bearing portion located at the arbor, and a first restraint bearing portion located at the first axial restraint. The first arbor bearing portion and the first restraint bearing portion are configured to define a single point contact therebetween.

Additionally or alternatively, in this or other embodiments the first restraint bearing portion includes a first adapter installed to the first axial restraint, and a first angular contact bearing installed to the first axial restraint and supportive of the first adapter. The first angular contact bearing allows for rotation of the first adapter about the central longitudinal axis relative to the first axial restraint.

Additionally or alternatively, in this or other embodiments when the first arbor bearing portion contacts a first contact surface of the first adapter, the first adapter rotates about the central longitudinal axis together with the arbor.

Additionally or alternatively, in this or other embodiments the first contact surface is flat and planar.

Additionally or alternatively, in this or other embodiments the contact surface has a non-planar shape.

Additionally or alternatively, in this or other embodiments the first bearing portion is one of a ball bearing or a conical bearing.

Additionally or alternatively, in this or other embodiments the first axial restraint includes a first restraint base, and a first restraint arm located at the central longitudinal axis and extending axially from the first restraint base toward the arbor. The first restraint bearing portion is installed to the first restraint arm.

Additionally or alternatively, in this or other embodiments a second axial restraint is located at a second axial end of the arbor opposite the first axial end. The second axial restraint is rotationally stationary and is configured to limit axial travel of the arbor toward the second axial restraint during rotation of the arbor. A second bearing assembly operably connects the arbor to the second axial restraint. The second bearing assembly includes a second arbor bearing portion located at the arbor, and a second restraint bearing portion located at the second axial restraint. The second arbor bearing portion and the second restraint bearing portion are configured to define a single point contact therebetween.

Additionally or alternatively, in this or other embodiments the second restraint bearing portion includes a second adapter installed to the second axial restraint, and a second angular contact bearing installed to the second axial restraint and supportive of the second adapter. The second angular contact bearing allows for rotation of the second adapter about the central longitudinal axis relative to the second axial restraint.

Additionally or alternatively, in this or other embodiments the first axial restraint and the second axial restraint together limit travel of the arbor along the central longitudinal axis.

In another embodiment, a method of operating a balancing system of a rotor assembly includes installing a rotor assembly to an arbor, rotating the arbor and the rotor assembly together about a central longitudinal axis, and limiting axial travel of the arbor along the central longitudinal axis via a first axial restraint disposed at a first axial end of the arbor. The first axial restraint is rotationally stationary and is configured to limit axial travel of the arbor toward the first axial restraint during rotation of the arbor. A first bearing assembly is located between the arbor and the first axial restraint. The first bearing assembly includes a first arbor bearing portion located at the arbor, and a first restraint bearing portion located at the first axial restraint. The first arbor bearing portion and the first restraint bearing portion are configured to define a single point contact therebetween.

Additionally or alternatively, in this or other embodiments the first restraint bearing portion includes a first adapter installed to the first axial restraint, and a first angular contact bearing installed to the first axial restraint and supportive of the first adapter. The first angular contact bearing allows for rotation of the first adapter about the central longitudinal axis relative to the first axial restraint.

Additionally or alternatively, in this or other embodiments when the first arbor bearing portion contacts a first contact surface of the first adapter, the first adapter rotates about the central longitudinal axis together with the arbor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
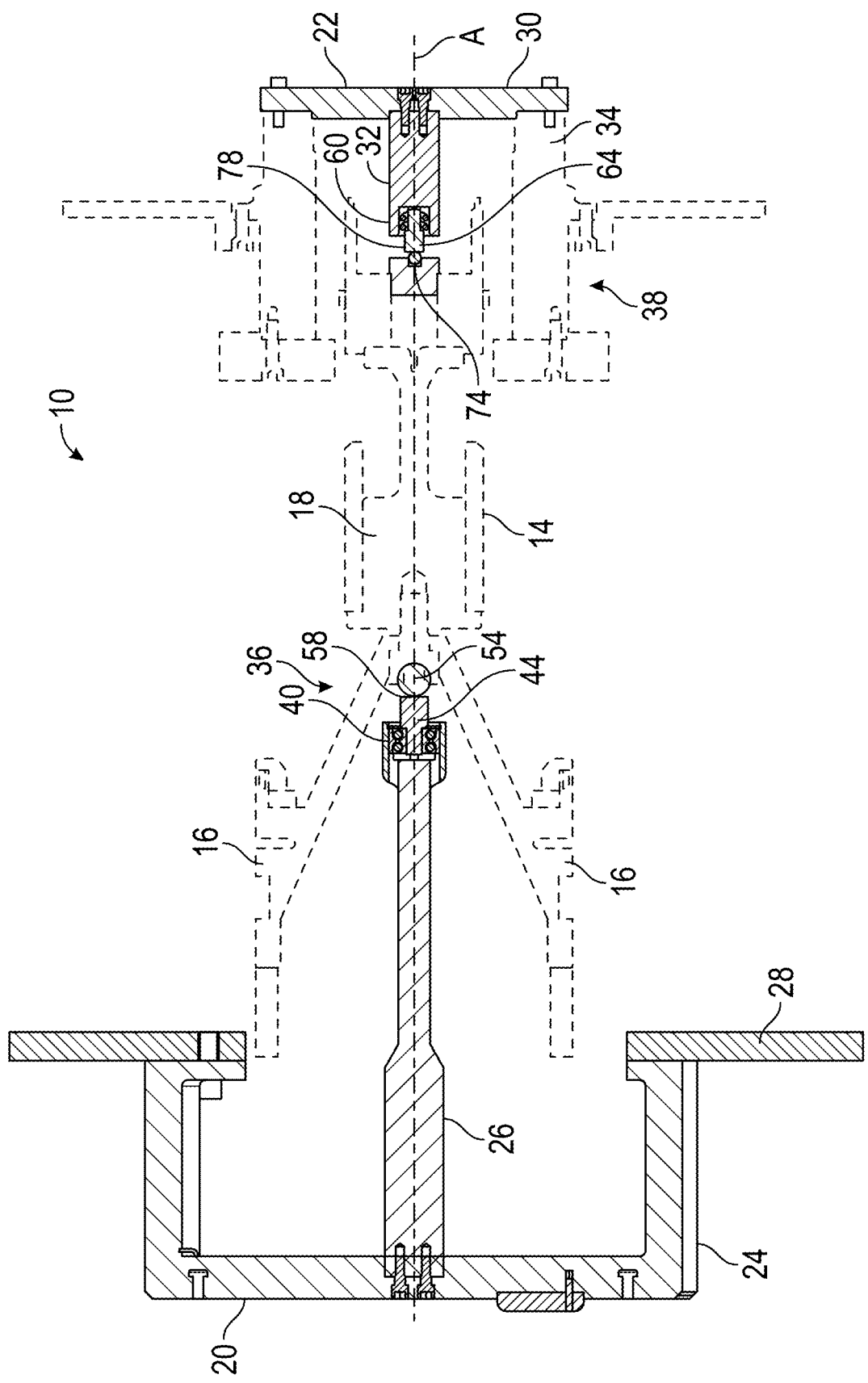
FIG. 1 is an embodiment of a restraint system for rotor assembly balancing.
Figure 2:
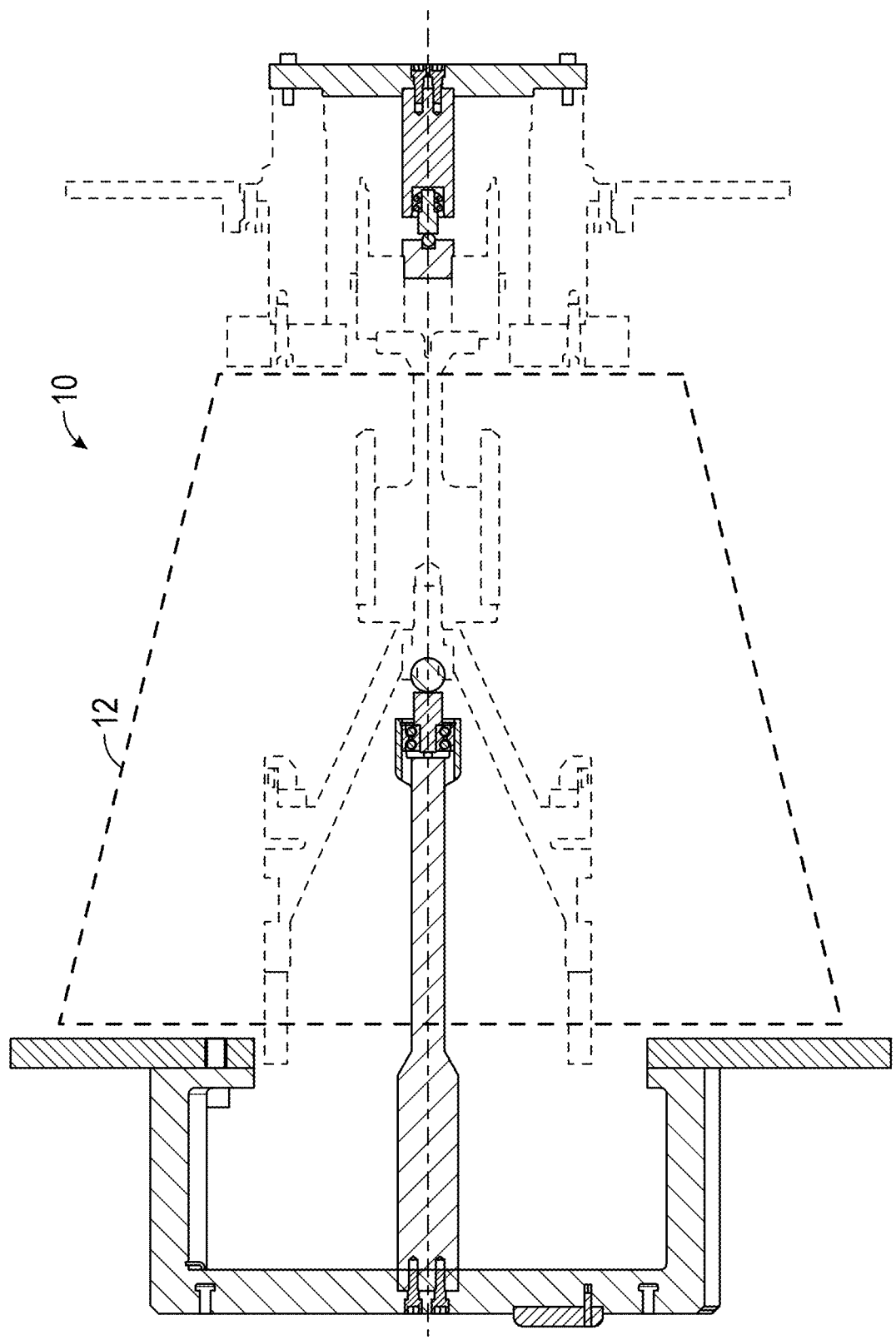
FIG. 2 is a schematic illustration of a rotor assembly installed in the restraint system.

Referring now to FIG. 1, illustrated is an embodiment of a mounting and retaining system 10 for a rotor assembly 12 (schematically shown in FIG. 2). The mounting and retaining system 10 includes an arbor 14 to which the rotor assembly 12 is secured. The arbor 14 is rotatable about a central longitudinal axis A, together with the rotor assembly 12, which is secured thereto. The arbor 14 may include one or more arbor arms 16 extending from an arbor body 18, with the rotor assembly 12 securable to the one or more arbor arms 16. One skilled in the art will readily appreciate that the configuration of the arbor 14 illustrated in FIG. 1 is merely exemplary and the configuration may differ depending on, for example, the configuration of the rotor assembly 12 secured thereto.

The mounting and retaining system 10 further includes a first axial restraint 20 located at a first axial end of the arbor 14, and a second axial restraint 22 located at a second axial end of the arbor 14 opposite the first axial end. In some embodiments, the first axial restraint 20 corresponds to a forward axial restraint, relative to the rotor assembly 12. Similarly, in some embodiments the second axial restraint 22 corresponds to an aft axial restraint relative to the rotor assembly 12. The first axial restraint 20 includes a first restraint base 24 and a first restraint leg 26 secured to the first restraint base 24. The first restraint leg 26 is positioned at the central longitudinal axis A and extends along the central longitudinal axis A from the first restraint base 24 toward the arbor 14. The first axial restraint 20 is configured to be rotationally stationary about the central longitudinal axis A. In some embodiments, the first axial restraint 20 is secured to a first balance fixture 28, or other similar stationary structure.

Similarly, the second axial restraint 22 includes a second restraint base 30 and a second restraint leg 32 secured to the second restraint base 30. The second restraint leg 32 is positioned at the central longitudinal axis A and extends along the central longitudinal axis A from the second restraint base 30 toward the arbor 14. The second axial restraint 22 is configured to be rotationally stationary about the central longitudinal axis A. In some embodiments, the second axial restraint 22 is secured to a second balance fixture 34, or other similar stationary structure. The first axial restraint 20 and the second axial restraint 22 limit travel of the arbor 14 and rotor assembly 12 along the central longitudinal axis A during rotation of the arbor 14 and the rotor assembly 12 about the central longitudinal axis A. To accomplish this, the first axial restraint 20 interfaces with the arbor 14 via a first bearing assembly 36 and similarly the second axial restraint 22 interfaces with the arbor 14 via a second bearing assembly 38.

Figure 3:
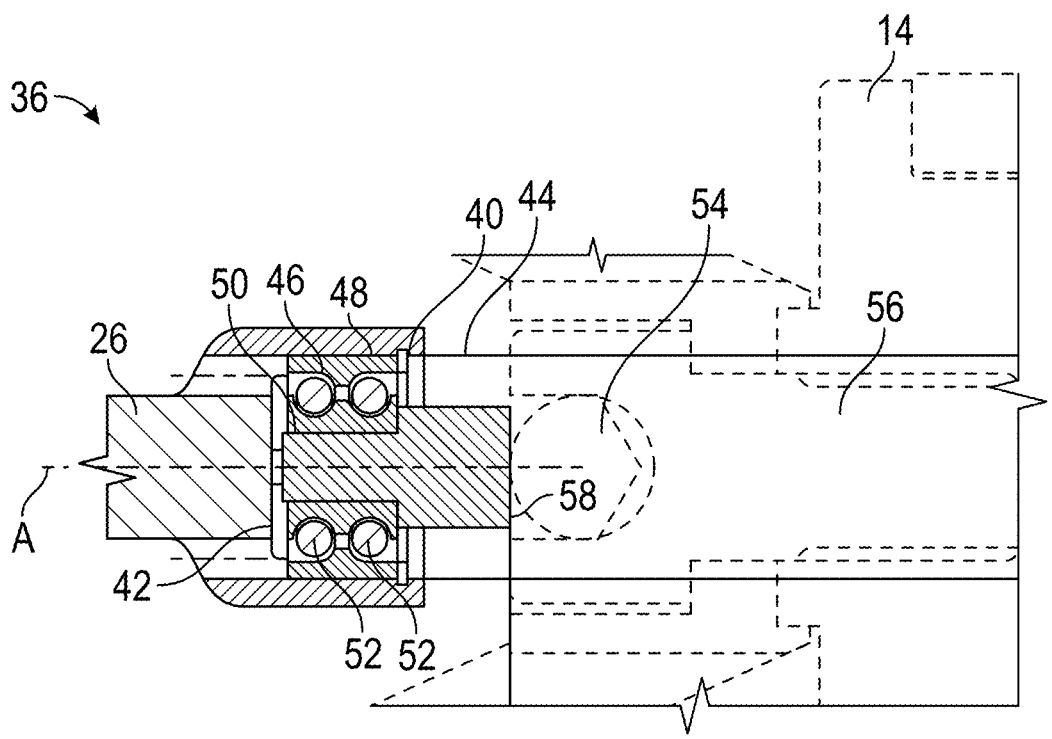
FIG. 3 is an illustration of an embodiment of a first bearing assembly of the restraint system.

An exemplary first bearing assembly 36 is illustrated in FIG. 3. In the first bearing assembly 36, a first angular contact bearing 40 is installed to the first restraint leg 26, at a distal end of the first restraint leg 26 opposite to the first restraint base 24. The first restraint leg 26 may include a first leg socket 42 in which the first angular contact bearing 40 is installed. The first angular contact bearing 40 is supportive of a first adapter 44 installed in the first leg socket 42. The first angular contact bearing 40 includes a bearing outer race 46 abutting an inner wall 48 of the first leg socket 42 and a bearing inner race 50 radially offset from the bearing outer race 46 and abutting the first adapter 44. A plurality of bearing elements 52 are located between the bearing outer race 46 and the bearing inner race 50. A first arbor bearing 54 is installed to the arbor 14 at, for example, a first bearing support 56. In some embodiments, such as shown in FIG. 3, the first arbor bearing 50 is a ball bearing. The first adapter 44 has a first contact surface 58 which is configured to contact the first arbor bearing 54 at a single point. In some embodiments, the first contact surface 58 is planar and precision ground. Upon contact with the first arbor bearing 54 during rotation of the arbor about the central longitudinal axis A, the first adapter 44 rotates about the central longitudinal axis A at the same rate as the arbor 14, while the first axial restraint 20 remains rotationally stationary.

Figure 4:
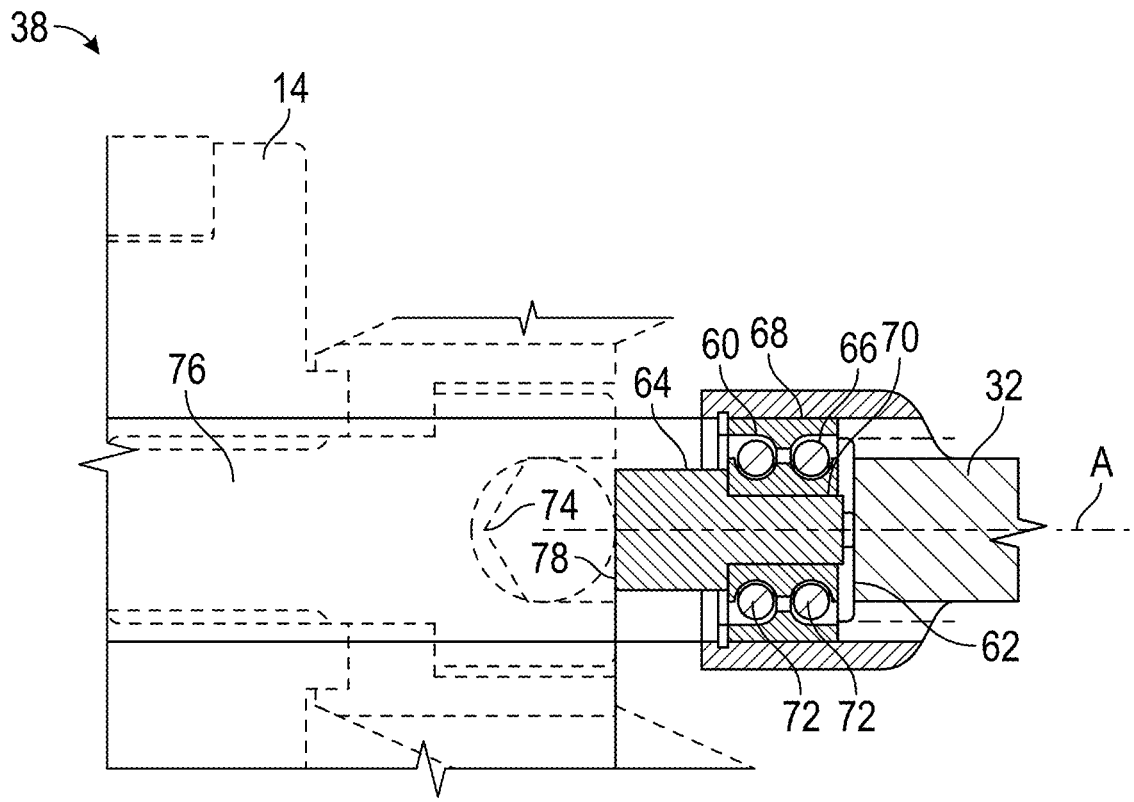
FIG. 4 is an illustration of an embodiment of a second bearing assembly of the restraint system.

Referring now to FIG. 4, the second bearing assembly 38 may be similarly constructed, with a second angular contact bearing 60 installed to the second restraint leg 32, at a distal end of the second restraint leg 32 opposite to the second restraint base 30. The second restraint leg 32 may include a second leg socket 62 in which the second angular contact bearing 60 is installed. The second angular contact bearing 60 is supportive of a second adapter 64 installed in the second leg socket 62. The second angular contact bearing 60 includes a bearing outer race 66 abutting an inner wall 68 of the second leg socket 62 and a bearing inner race 70 radially offset from the bearing outer race 66 and abutting the second adapter 64. A plurality of bearing elements 72 are located between the bearing outer race 66 and the bearing inner race 70. A second arbor bearing 74 is installed to the arbor 14 at, for example, a second bearing support 76. In some embodiments, the second arbor bearing 70 is a ball bearing. The second adapter 64 has a second contact surface 78 which is configured to contact the second arbor bearing 74 at a single point. In some embodiments, the second contact surface 78 is planar and precision ground. Upon contact with the second arbor bearing 74 during rotation of the arbor about the central longitudinal axis A, the second adapter 64 rotates about the central longitudinal axis A at the same rate as the arbor 14, while the second axial restraint 22 remains rotationally stationary.

In operation, with the first axial restraint 20 and the second axial restraint 22 installed, axial travel of the arbor 14 along the central longitudinal axis A is limited, such that as the arbor 14 axially translates toward the first axial restraint 20, the first arbor bearing 54 contacts the first contact surface 58 of the first adapter 44 at a single point, initiating rotation of the first adapter 44 about the central longitudinal axis A. This contact stops axial travel of the arbor 14 toward the first axial restraint 20. Similarly, as the arbor axially translates toward the second axial restraint 22, the second arbor bearing 74 contacts the second contact surface 78 of the second adapter 64 at a single point, initiating rotation of the second adapter 64 about the central longitudinal axis A. This contact stops axial travel of the arbor 14 toward the second axial restraint 22. In some embodiments, the first and second adapter 44/64 are spaced apart to allow some axial travel of the arbor 14, such that there is only contact between one of the arbor bearings 54/74 and the respective contact surface 58/78 at any time.

As described above and illustrated herein, in some embodiments the first arbor bearing 54 and second arbor bearing 74 are ball bearings, and the contact surfaces 58/78 are planar, but in other embodiments, they may have other configurations. For example, the arbor bearings 54/74 may be conical, and or the contact surfaces 58/78 may have non-planar shapes, so that a single point of contact is defined between the arbor bearing and the respective contact surface located on the central longitudinal axis. Further, while the arbor bearings 54/74 are described herein as installed to the arbor 14, and the adapters 44/64 are installed to the axial restraints 20/22, in some embodiments that configuration may be reversed, with the adapters 44/64 installed to the arbor 14 and the arbor bearings 54/74 installed to the axial restraints 20/22.

The configurations disclosed herein greatly reduce friction between the rotating and stationary components relative to a typical rotor balancing system. Further, the single point contact eliminates any angular moment forces induced to the system, and reduces noise or resonance that could interrupt the balancing software thus resulting in easier detection of a true unbalance of the rotor assembly.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An assembly of a rotating component and a rotationally stationary component, comprising:
    a first bearing portion disposed at the rotating component and rotatable therewith; and
    a second bearing portion disposed at the rotationally stationary component, the second bearing portion supported at the rotationally stationary component and rotatably with the rotating component when in contact with the first bearing portion;
    wherein the first bearing portion and the second bearing portion define a single point contact therebetween;
    wherein when the first bearing portion contacts a contact surface of the second bearing portion, the second bearing portion rotates together with the rotating component.

2. The assembly of claim 1, further comprising a first angular contact bearing installed to the rotationally stationary component and supportive of the second bearing portion, the angular contact bearing allowing for rotation of the second bearing portion relative to the rotationally stationary component.

3. The assembly of claim 1, wherein the contact surface is flat and planar.

4. The assembly of claim 1, wherein the contact surface has a non-planar shape.

5. The assembly of claim 1, wherein the first bearing portion is one of a ball bearing or a conical bearing.

6. A system for balancing a rotor assembly, comprising:
    an arbor to which a rotor assembly is installable, such that the arbor and rotor assembly are rotatable together about a central longitudinal axis;
    a first axial restraint disposed at a first axial end of the arbor, the first axial restraint rotationally stationary and configured to limit axial travel of the arbor toward the first axial restraint during rotation of the arbor;
    a first bearing assembly to operably connect the arbor to the first axial restraint, the first bearing assembly including:
        a first arbor bearing portion disposed at the arbor; and
        a first restraint bearing portion disposed at the first axial restraint;
        wherein the first arbor bearing portion and the first restraint bearing portion are configured to define a single point contact therebetween.

7. The system of claim 6, wherein the first restraint bearing portion includes:
    a first adapter installed to the first axial restraint; and
    a first angular contact bearing installed to the first axial restraint and supportive of the first adapter, the first angular contact bearing allowing for rotation of the first adapter about the central longitudinal axis relative to the first axial restraint.

8. The system of claim 7, wherein when the first arbor bearing portion contacts a first contact surface of the first adapter, the first adapter rotates about the central longitudinal axis together with the arbor.

9. The system of claim 8, wherein the first contact surface is flat and planar.

10. The system of claim 8, wherein the contact surface has a non-planar shape.

11. The assembly of claim 6, wherein the first arbor bearing portion is one of a ball bearing or a conical bearing.

12. The system of claim 6, wherein the first axial restraint includes:
- a first restraint base; and
- a first restraint arm disposed at the central longitudinal axis and extending axially from the first restraint base toward the arbor;
- wherein the first restraint bearing portion is installed to the first restraint arm.

13. The system of claim 6, further comprising:
- a second axial restraint disposed at a second axial end of the arbor opposite the first axial end, the second axial restraint rotationally stationary and configured to limit axial travel of the arbor toward the second axial restraint during rotation of the arbor;
- a second bearing assembly to operably connect the arbor to the second axial restraint, the second bearing assembly including:
  - a second arbor bearing portion disposed at the arbor; and
  - a second restraint bearing portion disposed at the second axial restraint;
  - wherein the second arbor bearing portion and the second restraint bearing portion are configured to define a single point contact therebetween.

14. The system of claim 13, wherein the second restraint bearing portion includes:
- a second adapter installed to the second axial restraint; and
- a second angular contact bearing installed to the second axial restraint and supportive of the second adapter, the second angular contact bearing allowing for rotation of the second adapter about the central longitudinal axis relative to the second axial restraint.

15. The system of claim 13, wherein the first axial restraint and the second axial restraint together limit travel of the arbor along the central longitudinal axis.

16. A method of operating a balancing system of a rotor assembly, comprising:
- installing a rotor assembly to an arbor;
- rotating the arbor and the rotor assembly together about a central longitudinal axis;
- limiting axial travel of the arbor along the central longitudinal axis via a first axial restraint disposed at a first axial end of the arbor, the first axial restraint rotationally stationary and configured to limit axial travel of the arbor toward the first axial restraint during rotation of the arbor;
- wherein a first bearing assembly is disposed between the arbor and the first axial restraint, the first bearing assembly including:
  - a first arbor bearing portion disposed at the arbor; and
  - a first restraint bearing portion disposed at the first axial restraint;
  - wherein the first arbor bearing portion and the first restraint bearing portion are configured to define a single point contact therebetween.

17. The method of claim 16, wherein the first restraint bearing portion includes:
- a first adapter installed to the first axial restraint; and
- a first angular contact bearing installed to the first axial restraint and supportive of the first adapter, the first angular contact bearing allowing for rotation of the first adapter about the central longitudinal axis relative to the first axial restraint.

18. The method of claim 17, wherein when the first arbor bearing portion contacts a first contact surface of the first adapter, the first adapter rotates about the central longitudinal axis together with the arbor.

* * * * *